(12) United States Patent
Fong

(10) Patent No.: US 6,562,269 B2
(45) Date of Patent: May 13, 2003

(54) LAYER NORMALIZING DEVICE FOR SELECTIVE DEPOSITION MODELING

(75) Inventor: Jon Jody Fong, Calabasas, CA (US)

(73) Assignee: 3D Systems, Inc., Valencia, CA (US)

( * ) Notice: Subject to any disclaimer, the term of this patent is extended or adjusted under 35 U.S.C. 154(b) by 307 days.

(21) Appl. No.: 09/754,870

(22) Filed: Jan. 5, 2001

(65) Prior Publication Data

US 2002/0089081 A1 Jul. 11, 2002

(51) Int. Cl.[7] .......................... B29C 41/02; B29C 71/00
(52) U.S. Cl. ...................... 264/232; 264/308; 425/215; 425/375
(58) Field of Search ................ 264/232, 308; 425/215, 375

(56) References Cited

U.S. PATENT DOCUMENTS

| 4,164,606 A | 8/1979 | Spirig |
| 4,274,479 A | 6/1981 | Eastman |
| 5,303,141 A | 4/1994 | Batchelder et al. |
| 5,555,176 A | 9/1996 | Menhennett et al. |
| 5,572,431 A | 11/1996 | Brown et al. |
| 5,651,934 A * | 7/1997 | Almquist et al. ....... 264/308 X |
| 5,859,775 A | 1/1999 | Barlage, III et al. |
| 5,902,537 A | 5/1999 | Almquist et al. |
| 5,943,235 A | 8/1999 | Earl et al. |

* cited by examiner

Primary Examiner—Leo B. Tentoni
(74) Attorney, Agent, or Firm—Ralph D'Alessandro; James E. Curry

(57) ABSTRACT

An improved layer normalizing device for use in dimensionally normalizing layers of a three-dimensional model produced by a selective deposition modeling technique. The layer normalizing device employs a wicking member having a body and a normalizing surface for dimensionally normalizing the object while the object is being built layer by layer. The body includes a plurality of interstices, and when the wicking member is sufficiently heated to cause the build material to become flowable, excess material is drawn by capillary action from the layer of the object being normalized and into the wicking member. A refreshing means is provided to remove the excess build material from the interstices of the wicking member and allow the wicking member to draw additional build material by capillary action.

19 Claims, 6 Drawing Sheets

LAYER NORMALIZING DEVICE FOR SELECTIVE DEPOSITION MODELING

BACKGROUND OF THE INVENTION

1. Field of the Invention

The invention relates in general to solid freeform fabrication and, in particular, to a layer normalizing device for use in producing parts by selective deposition modeling techniques. The layer normalizing device utilizes capillary action to wick excess build material away from the part.

2. Description of the Prior Art

Recently, several new technologies have been developed for the rapid creation of models, prototypes, and parts for limited run manufacturing. These new technologies can generally be described as solid freeform fabrication, herein referred to as "SFF". In SFF, complex parts are produced from a modeling material in an additive fashion as opposed to traditional fabrication techniques, which are generally subtractive in nature. For example, in traditional fabrication techniques material is removed by machining operations or shaped in a die or mold to near net shape and then trimmed. In contrast, additive fabrication techniques incrementally add portions of a build material to targeted locations, layer by layer, in order to build a complex part. Generally, SFF technologies, such as stereolithography and the like, utilize a computer graphic representation of a part and a supply of a building material to fabricate the part in successive layers.

One category of SFF that has recently emerged is selective deposition modeling, herein referred to as "SDM". In SDM, a solid modeling material is physically deposited in successive fashion to form an object. In one type of SDM technology the solid modeling material is extruded as a continuous filament through a resistively heated nozzle. In yet another type of SDM technology the solid modeling material is jetted or dropped in discrete droplets in order to build up a part. Often, a thermoplastic material having a low-melting point is used as the solid modeling material, which is delivered through a jetting system such as those used in ink jet printers. One type of SDM process utilizing ink jet print heads is described, for example, in U.S. Pat. No. 5,555,176 to Menhennett, et al. Another type of SDM process which extrudes a bead of material to build a part is described, for example, in U.S. Pat. No. 5,303,141 to Batchelder et al.

Although SFF methods have many advantages compared to conventional fabrication methods, they also have inherent problems routed in the layer by layer building process. One common problem in the layer by layer building process results from the dimensional variability inherent in the building of each layer. These dimensional inaccuracies occur from the accumulated effects of drop volume variation, thermal distortion, and the like. If unchecked, these tolerances can accumulate throughout the part as it is built up in height layer by layer. As the thickness of layers are reduced to achieve greater surface resolution, the accumulated buildup of these undesirable tolerances can substantially distort the resultant part. Thus, most SDM processes require some method to dimensionally normalize the part while it is being built. Generally, all dimensional normalization methods involve physically adjusting the vertical height of the part by smoothing or leveling the build material deposited in the layers. One common approach is to dispense each layer of build material at a greater thickness than desired so that the normalizing device can then remove the excess build material to achieve the desired thickness and thereby eliminate undesirable distortions between the layers. Alternatively, some methods do not dimensionally normalize each layer but normalize only after a certain number of layers have been deposited. Still other methods selectively normalize a layer after receiving instructions from active sensor controls monitoring the build process.

One approach to providing a system to dimensionally normalize a part while being built by an SDM apparatus is found in U.S. Pat. No. 5,943,235 to Earl et al., wherein a pre-heated rotating planarizer is provided to normalize each layer. Under this approach, after a layer of build material has been deposited by the SDM apparatus in excess of the necessary amount to achieve a desired thickness, the pre-heated cylindrical roller (planarizer) is precisely passed over the deposited material. The rolling planarizer locally melts some of the build material that adheres to its surface as it rolls to thereby dimensionally normalize the deposited layer to conform to the desired thickness of the layer. A wiping or scraping device such as a blade is needed to peel or skive off the excess build material from the planarizer. Undesirably, the rolling planarizer must be manufactured to precise tolerances in order to achieve the desired accuracy. It is also difficult to precisely regulate and maintain the temperature of the surface of the planarizer. This is due in part because the planarizer is subject to non-uniform convection heat transfer as it rotates, and the heater element only provides a uniform delivery of heat through the rotating axis of the planarizer. The planarizer is also thermally inefficient as it consumes a significant amount of energy that is undesirably dissipated into the environment. The planarizer also occupies a significant amount of space within the SDM apparatus and thereby limits the over-travel distance of the dispensing carriage. The planarizer also has moving parts that are subject to wear and degradation. Airborne contaminants are also prone to accumulate on the planarizer. In short, the heated rotating planarizer adds significant cost and complexity to an SDM apparatus, occupies precious space, adds inertia, is subject to wear, and requires maintenance and adjustment.

Other approaches to providing a system to dimensionally normalize a part while being built by an SDM apparatus is found in U.S. Pat. No. 5,859,775 to Barlage, III et al. and U.S. Pat. No. 5,572,431 to Brown et al. Under these approaches, a heated body is selectively driven across the dispensed build material in response to a sensed deviation in order to melt and displace the build material. These approaches also suggest providing a vacuum source connected to the heated body to actively suck off excess build material through the heated body. Thus, dimensional normalization is discretely accomplished in response to a sensed deviation monitored by the system. Such active monitoring/normalizing methods undesirably add additional complexity and cost to the SDM apparatus. In addition, without a wiping system the heated body is prone to undesirably accumulate build material on its normalizing surface. Such accumulation can adversely impact dimensional normalization operations.

Thus, there is a need to provide an SDM process with an improved layer normalizing device capable of dimensionally normalizing parts as they are built layer by layer. There is also a need to provide a layer normalizing device that is inexpensive and requires a minimal amount of maintenance and repair. There is also a need to provide a layer normalizing device which withdraws excess build material from the surface of the object being built without allowing the build material to accumulate on the surface of the device. These and other difficulties of the prior art have been overcome according to the present invention.

BRIEF SUMMARY OF THE INVENTION

The present invention provides its benefits across a broad spectrum of SFF processes. While the description which follows hereinafter is meant to be representative of a number of such applications, it is not exhaustive. As will be understood, the basic apparatus and methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to provide a new layer normalizing device for use in an SDM apparatus capable of being maintained at a more uniform temperature.

It is another aspect of the present invention to provide a new layer normalizing device for use in an SDM apparatus that removes excess build material from the surface of the object being built, without the application of mechanical forces.

It is yet another aspect of the present invention to provide a new layer normalizing device that removes excess build material from the surface of the object being built while preventing the build material from adhering to the normalizing surface of the device.

It is a feature of the present invention to utilize capillary action to wick excess build material from the surface of the object instead of relying on mechanical forces such as wiping and scraping.

It is another feature of the present invention to dimensionally normalize an object being built with a heated porous material having interstices that provide the geometric configuration necessary to initiate the capillary action to wick the excess build material from the surface of the object.

It is still another feature of the present invention to provide a material refreshing means to expel build material from the interstices of the normalizing device in order to prevent the interstices from reaching a point of saturation where the capillary action would terminate.

It is an advantage of the present invention to dimensionally normalize each layer of an object built by an SDM apparatus with a simple layer normalizing device that has no moving parts and can be uniformly heated and maintained within a desired temperature range.

It is another advantage of the present invention that material can be removed from the surface of an object being built by an SDM apparatus without the need for mechanical operations such as skiving, peeling, swiping, scraping, or the like.

It is yet another advantage of the present invention to produce a layer normalizing device that has no rotating parts, that is inexpensive to produce, and that occupies a minimum amount of space within an SDM apparatus.

These and other aspects, features, and advantages are achieved/attained in the apparatus of the present invention that employs a wicking member having a normalizing surface and a plurality of interstices for dimensionally normalizing the object while the object is being built layer by layer. The wicking member is sufficiently heated to cause the build material that it contacts to change to a flowable state, and due to capillary action of the interstices of the wicking member, the excess build material from the layer of the object being normalized is drawn into the wicking member. A refreshing means is provided to remove the excess build material from the interstices of the wicking member in order to allow the wicking member to draw additional build material by capillary action into the interstices.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements that are common to the figures.

DETAILED DESCRIPTION OF THE PREFERRED EMBODIMENTS

Figure 1:
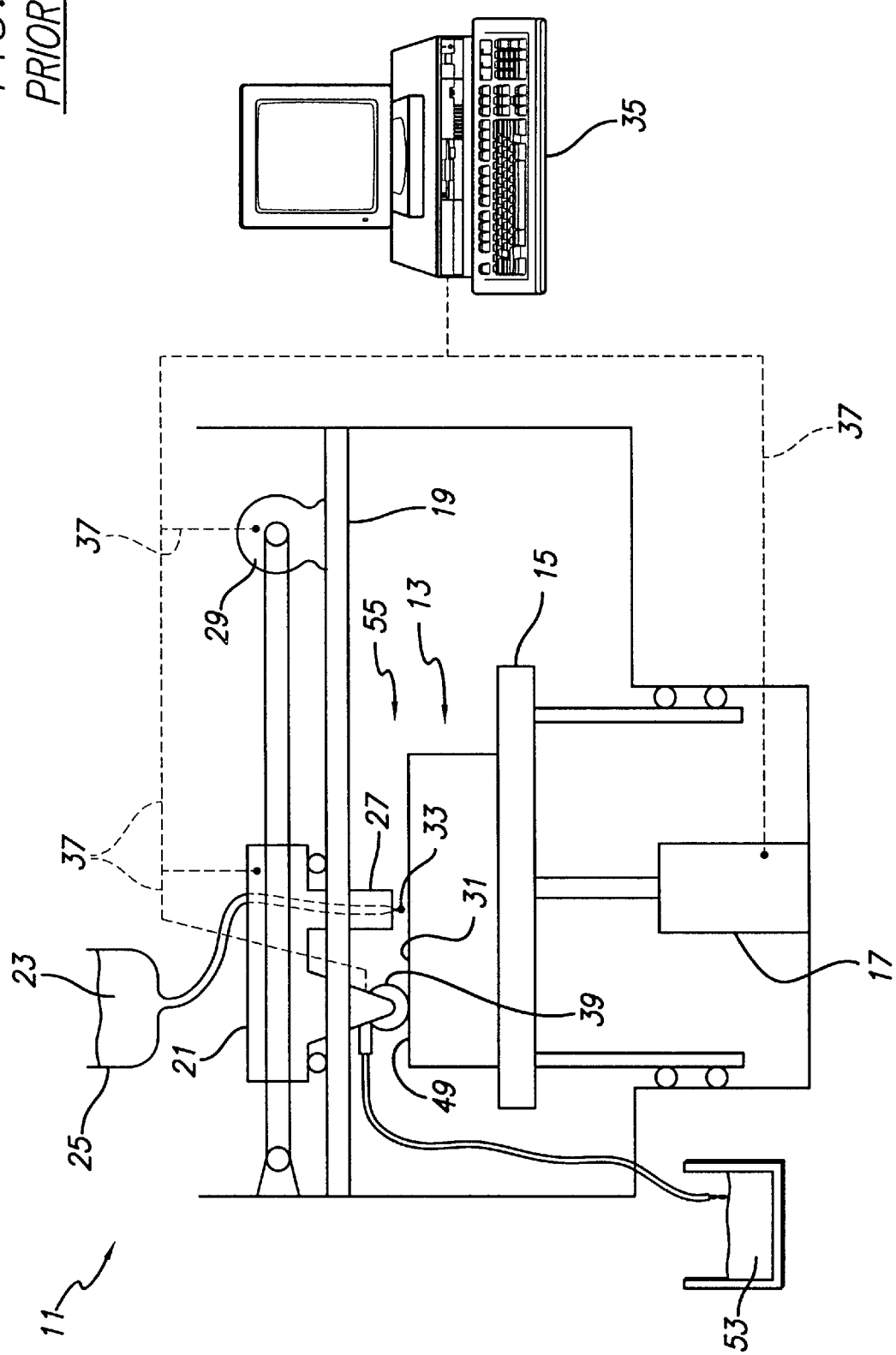
FIG. 1 is a schematic side view of an SDM apparatus using a prior art planarizer for dimensionally normalizing layers.

Referring particularly to FIG. 1, there is illustrated generally by the numeral 11 a prior art SDM apparatus that can be adapted to incorporate the present invention layer normalizing device. The SDM apparatus 11 is shown building a three-dimensional object indicated generally by the numeral 13. The object is built in a layer by layer manner on a build platform 15 that can be precisely positioned vertically by any conventional actuation means 17 within the build environment illustrated generally by the numeral 55. The object is built in a layer by layer manner by dispensing a build material in a flowable state. Generally, the build material is normally in a solid state and changes to a flowable state when maintained at or above the flowable temperature of the material. The build environment 55 is maintained at a temperature below the flowable temperature of the build material so that the three-dimensional part will solidify as the build material is dispensed. Directly above and parallel to the platform 15 is a rail system 19 on which a material dispensing trolley 21 resides. The dispensing trolley is fed a build material 23 from a material reservoir 25 that heats and maintains the material above its flowable temperature, thereby existing in its liquid or flowable state. Located on the dispensing trolley is at least one ink jet print head 27 for dispensing the build material. The trolley is reciprocally driven along a horizontal path by a conventional drive means 29. Generally, the trolley 21 takes multiple passes to dispense one complete layer of material from the ink jet print head 27. In FIG. 1, a portion of a layer of dispensed material 31 is shown as the trolley has just started its pass from left to right. Dispensed droplets 33 are shown in mid-flight, and the distance between the ink jet print head 27 and the layer 31 of build material is greatly exaggerated for ease of illustration.

Preferably, a remote computer 35 generates a solid modeling CAD data file containing three-dimensional coordinate data of an object, commonly referred to as an STL file. When a user desires to build an object, a print command is executed at the remote computer in which the STL file is processed through print client software that is sent to the SDM apparatus 11 as a print job. The CAD object data, typically in STL format or its equivalent, can be processed and transmitted to the SDM apparatus by any conventional data transferable medium desired, such as by magnetic disk tape, microelectronic memory, or the like. The data transmission route and controls of the SDM apparatus are represented as dashed lines at 37. The data is processed into a prescribed pattern for each layer of the three-dimensional object to be built.

In FIG. 1, a prior art planarizer 39 is shown that is used to successively shape the layers as needed. Such shaping is needed in order to eliminate the accumulated effects of drop volume variation, thermal distortion, and the like, which occur during the build process. The planarizer 39 is mounted to the material dispensing trolley 21 such that it is allowed to project from the underside of the platform by a sufficient amount in the Z-direction so that it contacts the material layer 31 at a desired level. Specifically, it is the function of the planarizer to melt, transfer, and remove portions of the previously dispensed layer of build material in order to smooth it out and set a desired thickness for the last formed layer. This is referred to as "dimensionally normalizing" a layer. As used herein, the term "dimensionally normalizing" refers to the process of equalizing at least a portion of a layer of build material so that the portion of the layer achieves a desired thickness, flatness, or shape. Often, dimensionally normalizing a layer requires the removal of excess build material, but not always. Whether the removal of build material is necessary depends on the build technique. The prior art planarizer shown and discussed herein is utilized in building techniques that deposit build material according to a prescribed pattern in excess of a desired thickness for each layer and then removes the excess build material for each layer to achieve the desired thickness.

Figure 2:
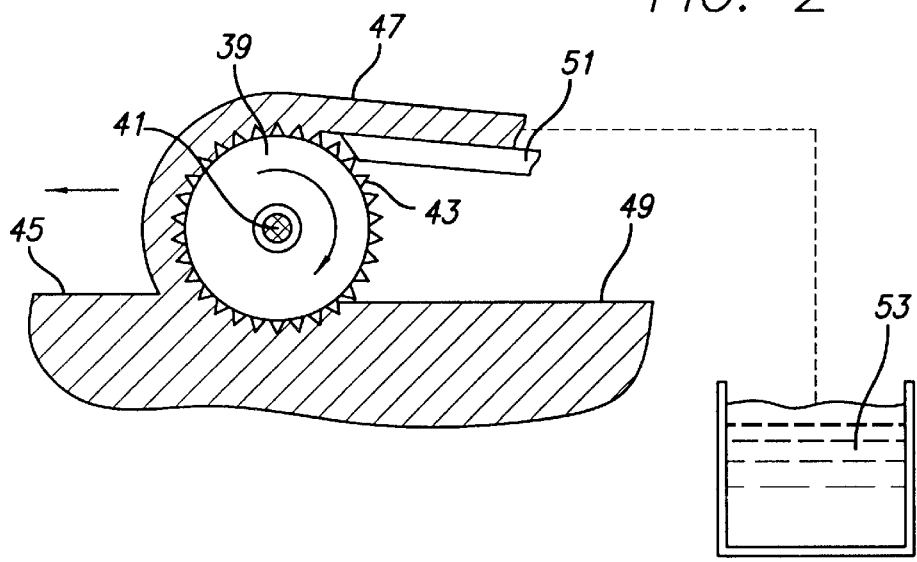
FIG. 2 is a side view of the prior art planarizer of FIG. 1.

Referring to FIG. 2, the planarizer 39 is heated by a heating element 41 located on the planarizers axis of rotation. In some configurations, the surface of the prior art planarizer or cylinder is textured (e.g. knurled) in order to enhance the adhesion of the build material to the planarizer that is to be removed. The heat transferred to the surface of the planarizer locally raises the temperature of the build material above its flowable temperature, thereby causing the material to transition to its molten state. Numeral 45 identifies a layer of build material that has just been deposited by the print head. The rotation of the planarizer or cylinder 39 sweeps molten material from the just-deposited layer 45, leaving in its path a smooth surface of build material 49. Some of the molten material adheres to the knurled surface of the cylinder and separates from the surface of the object, as indicated by numeral 47. This material 47 is displaced until it contacts wiper 51 that effectively skives or scrapes the layer of flowable material 47 off the surface 43 of the planarizer 39. The material is then disposed of in bin 53.

Undesirably, the prior art rolling planarizer is expensive to manufacture and has moving parts that are subject to wear and degradation. It is also difficult to precisely regulate the surface temperature of the planarizer during operation. The planarizer is also thermally inefficient as much of the energy used to heat the planarizer is dissipated into the air. Furthermore, airborne particles have an undesirable tendency to accumulate on the planarizer, and the planarizer occupies a significant amount of space in the SDM apparatus. The present invention layer normalizing device replaces the prior art planarizer and overcomes these problems.

Figure 3:
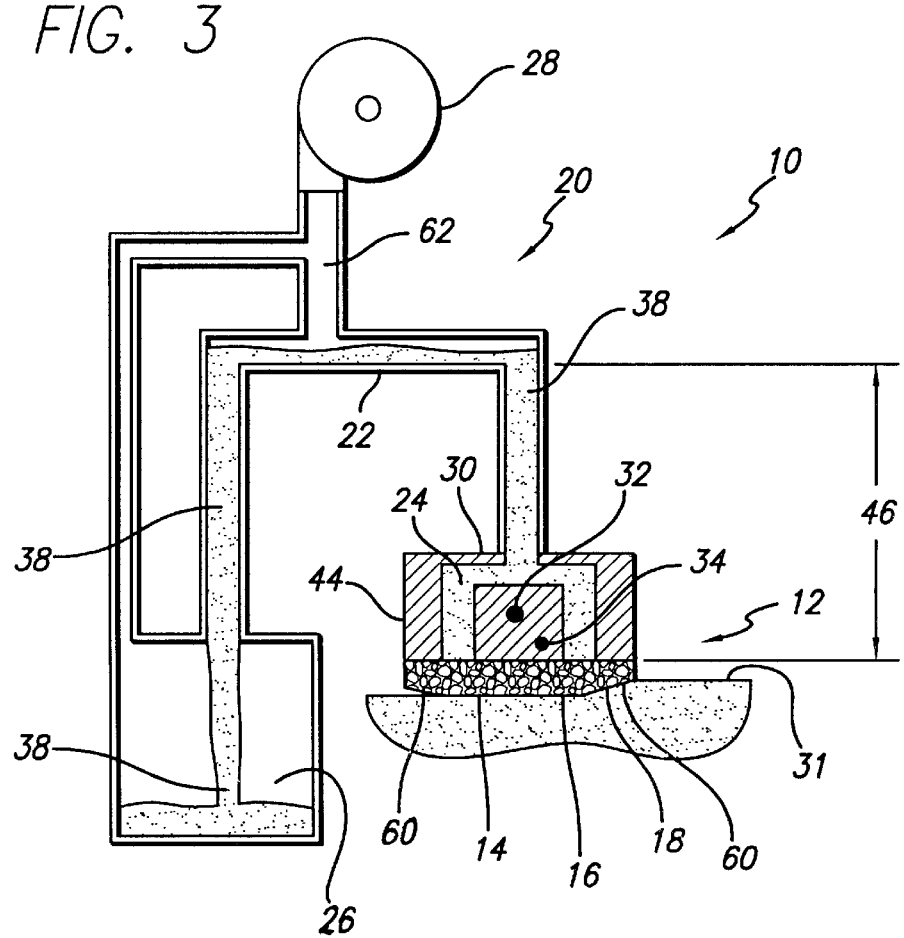
FIG. 3 is a schematic side view of an embodiment of the layer normalizing device present invention.

Referring to FIG. 3, there is shown generally at 10 a layer normalizing device of the present invention. The device 10 is shown in conjunction with a layer of recently deposited build material 31 to be normalized. In this embodiment the build material is a thermoplastic that must be elevated in temperature to achieve a flowable or molten state prior to being normalized. Any suitable heating means may be used such as incorporating a heater element energized by electric current, or providing a flame energized by a combustible gas. The layer normalizing device 10 comprises a wicking member generally shown at 12 that has a body 14 and a normalizing surface 16. In the embodiment shown in FIG. 3, the wicking member 12 is formed from one piece of a porous material. A suitable porous material is sintered stainless steel, although other porous metal materials may be used, if desired. Also, any generally rigid material made from a reticulated foam-type structure could be used, such as reticulated carbon or aluminum foam. The normalizing surface 16 is shown having a generally flat configuration and may include a slight taper as shown at numeral 60, if desired. In the embodiment shown, the heater means comprises a heater element 32 attached to the wicking member 12 that maintains the device 10 at a temperature above the flowable temperature of the build material. This is required to maintain the build material within the device 10 in a flowable state. A thermistor 34 is used to monitor the temperature of the device 10. Generally, the body 14 includes at least one interstice 18 for inducing capillary action to remove the excess build material 38. In the embodiment shown in FIG. 3, a plurality of interstices 18 is inherent within the body 14 of the wicking member that is made from a sintered porous stainless steel material.

The layer normalizing device 10 is unique in that capillary action is relied upon to wick the excess build material 38 away from the layer of the object as it is built by an SDM process. Referring now to the flowchart of FIG. 4, the layer normalizing device accomplishes the process of dimensionally normalizing a portion of a layer of build material according to the following steps. First, as identified at 36, heat is added to the build material in a given layer until the material achieves a flowable state. Second, as identified at 40, excess flowable build material is drawn from the surface of the layer by capillary action into the interstices 18 of the wicking member 12 thereby dimensionally normalizing the layer. Finally, as identified at 42, the excess build material 38 is ejected from the interstices 18 of the wicking member 12 in order to make room for additional build material to be wicked from the layer of the object. This final step is referred to as refreshing the wicking member. It should be noted, however, that prior to dimensionally normalizing a portion of a layer of build material, the layer of build material must have already been dispensed according to a prescribed pattern to form the portion of the layer of the three-dimensional object to be normalized. This can be accomplished by any conventional SDM technique, however, it is preferred that the build material be selectively dispensed into the build environment according to a prescribed pattern to form the portion of the layer of the three-dimensional object at a thickness greater than the desired thickness achieved after the layer has been dimensionally normalized.

Now, referring back to FIG. 3, the heater element 32 functions to keep the wicking member 12 at a temperature above the flowable temperature of the build material in order to maintain the build material inside the layer normalizing device 10 in a flowable state. The heating element also provides sufficient heat to the normalizing surface 16 of the wicking member 12 to heat the excess build material 38 on a given layer to a flowable state, as identified at step 36 of FIG. 4. Any suitable heating means can be used other than providing a heater element 32, such as a flame energized by a combustible fuel supply, or the like. The excess build material 38 is drawn by capillary action into the interstices 18 of the wicking member 12 as the normalizing surface 16 passes over the layer of the object, as required in step 40 of FIG. 4.

Figure 4:
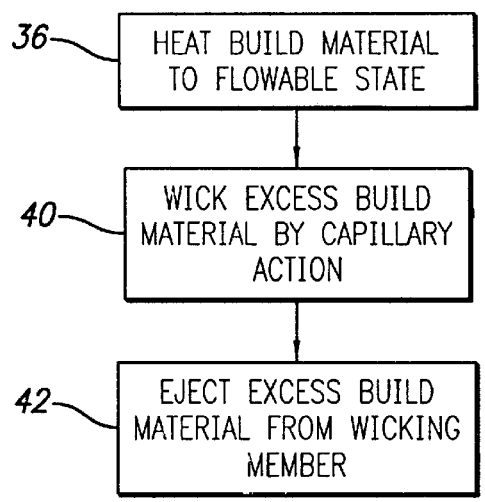
FIG. 4 is a flow chart of the process of dimensionally normalizing a layer of a three-dimensional object according to the present invention.

Identified generally at numeral 20 in FIG. 3 is a refreshing means for ejecting the build material from the interstices 18 of the wicking member 12, as required in step 42 of FIG. 4. The refreshing means 20 is needed to prevent the wicking member 12 from attaining a saturation point with the drawn build material, at which point the capillary action of the wicking member would cease. A refreshing means 20 is not needed if the wicking member 12 can draw all of the excess build material into its interstices 18 when building a three-dimensional object without reaching this saturation point. However, in most applications the amount of build material to be drawn by the wicking member 12 far exceeds the capacity of the wicking member to hold build material, thereby a refreshing means 20 is normally required. In the embodiment shown in FIG. 3, the refreshing means 20 comprises a siphon passage 22 between an upper reservoir 24 and lower reservoir 26. A vacuum source 28 is provided to apply a vacuum pressure to the siphon passage 22 that is slightly below atmospheric pressure in order to assist the siphon passage in ejecting the build material from the wicking member 12. Generally the vacuum source 28 is only required when it is necessary to overcome the inherent static pressure head 46 of the siphon passage 22, as identified in FIG. 3. The height of this static pressure head 46 has been greatly exaggerated for ease of illustration.

Figure 7:
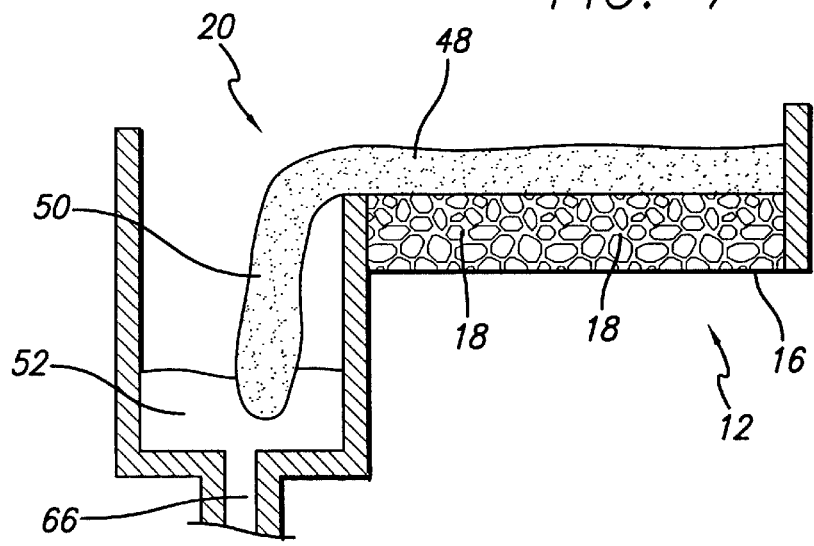
FIG. 7 is a schematic side view of still yet another embodiment of the present invention.

There are a variety of ways to eject the excess build material 38 from the wicking member 12. For instance, referring to FIG. 7, the refreshing means 20 comprises a second wicking member 48 positioned adjacent to the first wicking member 12. Preferably, the second wicking member 48 has a higher wicking capacity than the first wicking member 12 to assure that the flowable build material is transported by capillary action towards the lower portion 50 of the second wicking member 48. With the assistance of gravity, the flowable build material 52 can then drain out of the device. A high wicking absorbent composite, or superabsorbent, could be used, if desired, to eject or draw the flowable build material away from the first wicking member 12. Alternatively, a sintered metal wick could be used as disclosed in U.S. Pat. No. 4,274,479 to Eastman, or a wick formed from braided metal strands as disclosed in U.S. Pat. No. 4,164,606 to Spirig. In this configuration the refreshing means 20 operates primarily on capillary action with some gravitational assistance.

Whatever refreshing means 20 is used, it is important that the rate at which the material is ejected from the wicking member 12 equals the rate at which material is drawn into the wicking member by capillary action. If the rate at which the material is ejected from the wicking member 12 exceeds the rate at which the material is drawn into the wicking member, air will eventually be sucked into the interstices 18 of the wicking member. Conversely, if the rate at which the material is ejected from the wicking member 12 does not keep up with the rate at which the material is drawn into the wicking member by capillary action, the wicking member will eventually saturate and cease to draw additional build material.

Figure 5:
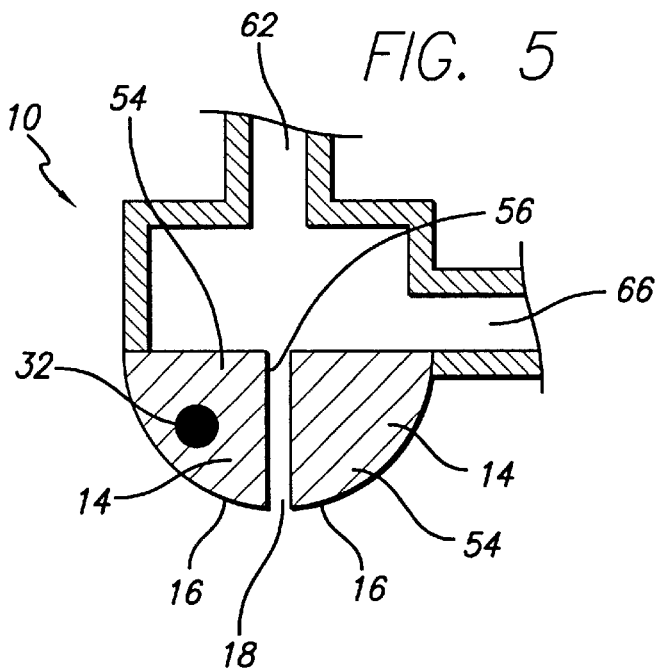
FIG. 5 is a schematic side view of another embodiment of the present invention.

Referring to FIG. 5, an alternative embodiment of the layer normalizing device 10 is shown. In this embodiment, the body 14 of the wicking member 12 is formed from two solid semi-spherical members 54 having parallel walls, only one of which is indicated by numeral 56. These parallel walls 56 establish the interstice 18 that draws the excess build material into the wicking member 12. The outer surfaces of the semi-spherical members 54 establish the normalizing surface 16 of the wicking member 12. In this configuration just one capillary or interstice 18 is established which traverses the entire length of the device 10. Alternatively, a plurality of interstices 18 could be provided, as shown at 54 in FIG. 6, by constructing the wicking member 12 in a layered configuration such as with parallel plates. The geometric shape of the interstice 18 need not be limited to that of a flat-walled passageway, but rather could be tapered or curved, if desired. Alternatively, a plurality of small bores could be provided in a solid piece to establish a plurality of interstices, such as those that can be made by drilling, boring, electrical discharge machining, or the like. A plurality of small tubes could be bundled and used as well to establish the interstices needed to provide capillary action, or a reticulated porous foam-type structure that is inherently full of interstices.

Figure 12:
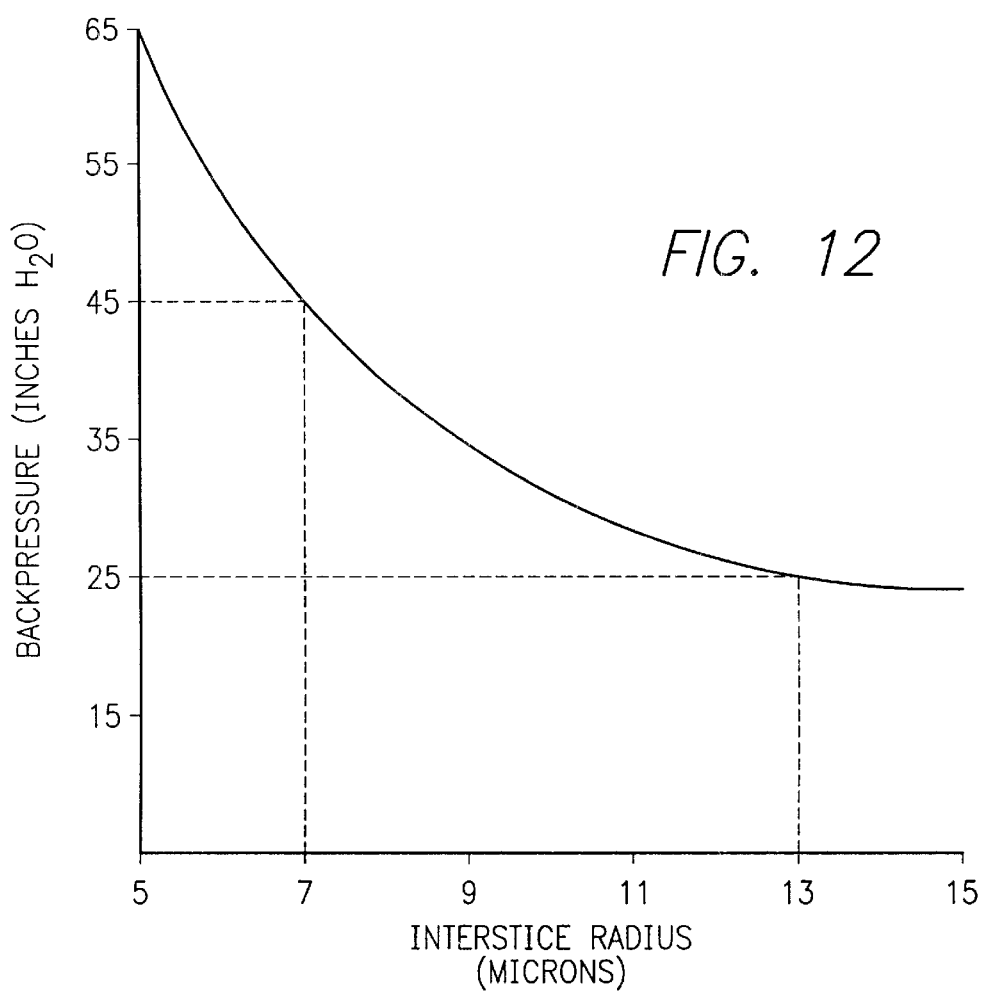
FIG. 12 is graph showing the relationship between capillary backpressure and interstice size.

It is important to consider the fundamentals of capillary action and orifice size when designing a given wicking member. The amount of backpressure achieved in a capillary is governed by the general equation:

$$h = 2\pi R\sigma \cos\alpha / \pi R^2 (\rho - \rho_a) g$$

where h is the backpressure or head measured in inches of $H_2O$, and R is the radius of the interstice or orifice, typically measured in microns. When designing a capillary interstice, gravity g and air density $\rho_a$, can generally be assumed as constant parameters that do not change. Fluid density $\rho$, whose value is influenced by the particular fluid to be drawn by capillary action, can also be considered generally constant for a given fluid build material. The surface energy $\sigma$, and wetting angle $\alpha$, whose values are influenced by the selection of the wicking material and the fluid build material, can also be considered as generally constant values for a particular wicking material and build material combination. Thus, for a given flowable material and a given wicking member material, the achievable capillary backpressure is inversely related to the orifice radius by the following relationship:

$$h = K * 1/R$$

where K is a constant. The capillary relationship between backpressure and orifice radius is schematically shown in FIG. 12 for a given wicking material and build material. For example, an orifice radius of 7 microns in FIG. 12 would produce a backpressure of approximately 45 inches of $H_2O$, while an orifice radius of 13 microns would produce a backpressure of approximately 25 inches of $H_2O$. Thus, for a given wicking material and given flowable build material, the relationship between the backpressure produced for a given interstice orifice size can be determined as it is commonly done in ink jet print head design. Once the relationship is determined, it can be used to optimally size the interstice(s) 18 of the wicking member 12 to achieve a desired capillary backpressure needed for a given SDM apparatus.

Figure 6:
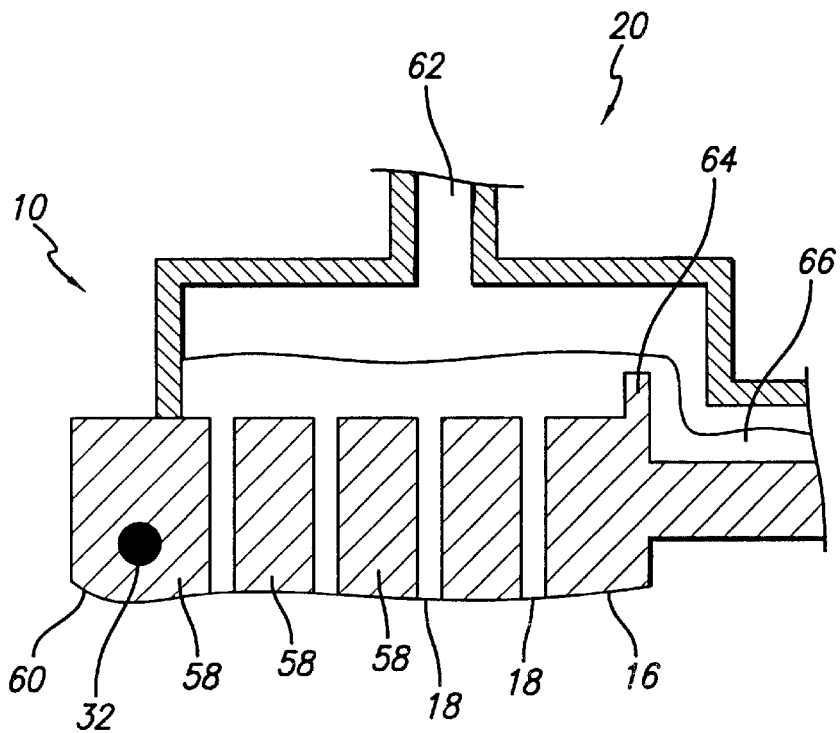
FIG. 6 is a schematic side view of yet another embodiment of the present invention.
Figure 9:
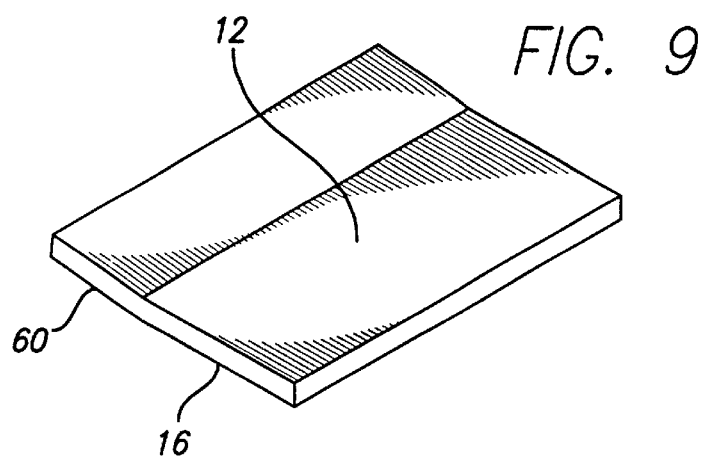
FIG. 9. is an isometric view of one configuration of the wicking member.
Figure 10:
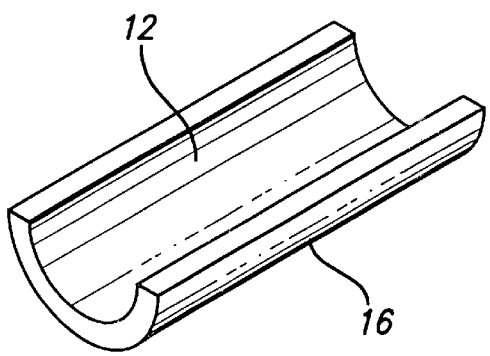
FIG. 10 is an isometric view of another configuration of the wicking member.
Figure 11:
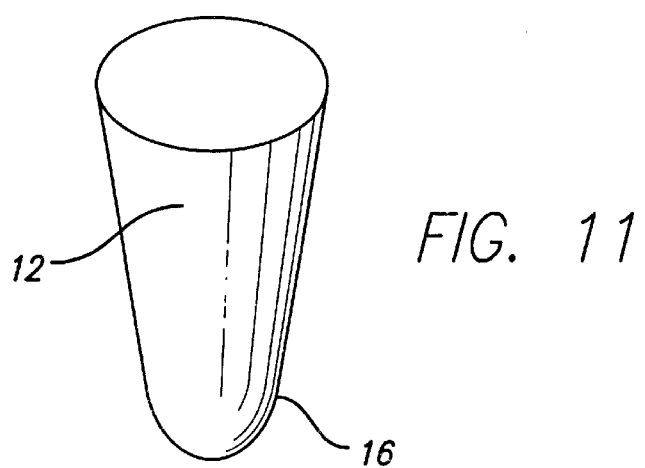
FIG. 11 is an isometric view of yet another configuration of the wicking member.

Referring to FIG. 6, a plurality of interstices 18 are established between solid members 58, and the normalizing surface 16 is generally flat having a slightly tapered front portion 60. In this embodiment the heater means comprises a heater element 32 attached to the wicking member 12 which provides sufficient heat to the solid members 58 to maintain the build material in a flowable state within the interstices 18. The refreshing means 20 of this embodiment includes a vacuum port 62 to be connected to a suitable vacuum source (not shown) to assist the capillary action in lifting the build material above the spillway 64, causing the material to be ejected out of port 66. The shape of the normalizing surface (16 and 60) in FIG. 6 is the same shape as that shown of the normalizing surface 16 of the wicking member 12 of FIG. 9 made from a reticulated porous structure. Also, two tapered portions 60 could be used, as shown in FIG. 3. The shape of the body 14 of the wicking member 12 could also be semi-circular, as shown in FIG. 10. Alternatively, the body 14 of the wicking member 12 could be formed as a protuberance, as shown as numeral 16 in FIG. 11, with the normalizing surface surrounding the protuberance.

Figure 8:
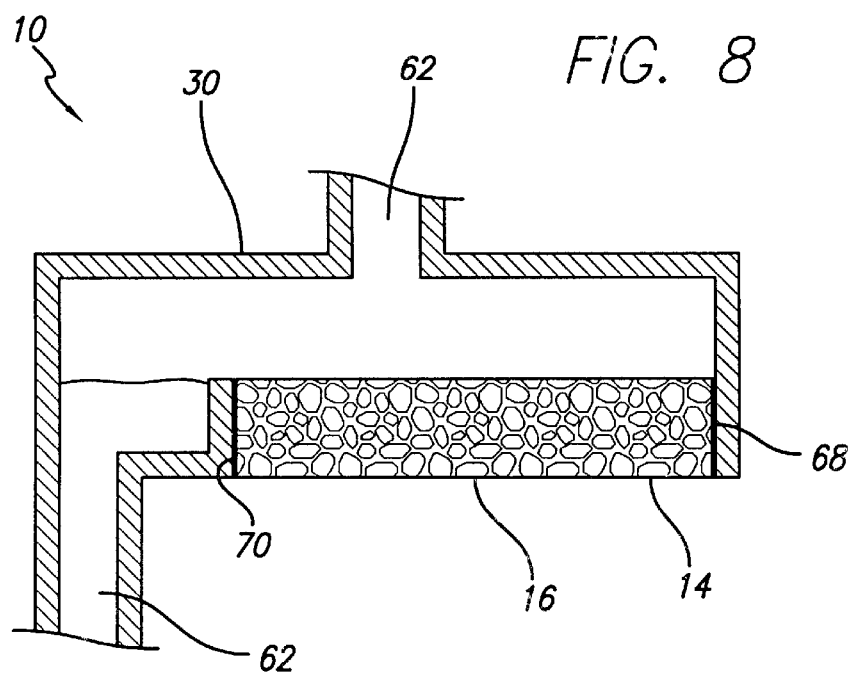
FIG. 8 is a schematic side view of another embodiment of the present invention.

An alternative embodiment of the layer normalizing device 10 is shown in FIG. 8 wherein the device is heated by applying an electric current through the wicking member 12 starting at the location indicated by numeral 68 and ending at the location indicated by numeral 70. In this embodiment, the reticulated porous wicking member 12 is made of an electrically resistive metal that emits heat when subject to an electric current. Some materials, for example, such as those sold under the trademarks Chromel A, available from the Hosking Manufacturing Co, or Nichrom 60, available from the Driver-Harris Co., or Inconel 600, available from the International Nickel Co., could readily be adapted for use as a wicking member 12 in this embodiment. Preferably the housing 30 of the device 10 would preferably be made from any appropriate dielectric material. Utilizing dielectric materials such as ceramics or high temperature plastics for the housing 82 of the device 10 would assure that the current applied to the wicking member 12 would not travel through the housing but properly travel through the wicking member.

The layer normalizing device 10 shown in FIG. 8 also includes vacuum source (not shown) being connected to vacuum port 62 in order to assist in ejecting the excess build material from the wicking member 12. It is the setting of this vacuum pressure that controls the precise flow rate of build material being wicked through the device 10 when dimensionally normalizing a layer. The vacuum pressure needed will generally be only about a few psi (pounds per square inch) below atmospheric pressure if the device is operated at atmospheric pressure, however the optimal value will depend on the amount of capillary action achieved by a given configuration of the wicking member 12.

FIG. 3 shows an embodiment of the present invention layer normalizing device 10 that was adapted to replace a prior art planarizer used on the ThermoJet® solid object printer, sold by 3D Systems, Inc., of Valencia, Calif. The wicking member 12 was made from a piece of sintered porous stainless steel approximately one inch wide by ten inches long by about one-tenth of an inch thick. The material for the wicking member 12 was purchased from the Mott Corporation, 84 Spring Lane, Farmington, Conn. 06032-3159. The wicking member 12 was encapsulated in a metal body 44 containing a heater element 32 that kept the device at a temperature of about 135 degrees Celsius. The build material was a thermoplastic material sold by 3D Systems, Inc. under the product name TJ88, which has a melting point of about 90 degrees Celsius. A vacuum source 28 was attached to the sealed metal body 84 which supplied an adjustable vacuum pressure to assist the siphon passage 22 in ejecting the flowable build material from the wicking member 12. The vacuum pressure was adjusted to achieve optimal results, but it was not measured. Designs of the layer normalizing device 10 were made and tested in the solid object printer using a sintered porous metal wicking member. The wicking member of one design had an average pore size of about 40 microns with a thickness of about 0.078 inches, and the other design having an average pore size of about 20 microns with a thickness of about 0.62 inches. The devices were attached to the solid object printer and three-dimensional objects were created utilizing the layer normalizing devices to dimensionally normalize each layer built. Build material was deposited for each layer according to a prescribed pattern in excess of the desired thickness of each layer, and each layer was then dimensionally normalized. Generally, the material was deposited in an amount that was approximately about 25% greater than the amount needed to achieve the desired thickness for each layer. Specifically a desired thickness of about 0.0016 inches for a given layer was desired, and the build material was initially dispensed to achieve approximately a layer thickness of about 0.0020 inches. On average about 0.0004 inches of material were removed during normalization. The excess material of each layer was removed by the capillary action of the layer normalizing device 10. Excellent results were achieved as finished parts were substantially no different from similar parts produced by the solid object printer utilizing the prior art planarizer.

In order to incorporate the layer normalizing device 10 into a SDM apparatus, it is first necessary to determine the mass flow rate of the material to be removed for each layer. For the ThermoJet® solid object printer, sold by 3D Systems, Inc., of Valencia, Calif., the mass flow rate of removal of build material needed is up to about 8 to 12 milliliters per minute. The mass flow rate achieved by the capillary action of the wicking member must generally equal the mass flow rate of the material removed from each layer by the SDM machine. The mass flow rate of the capillary action is dependent on a variety of parameters as discussed previously. The mass flow rate of the capillary action of the wicking member can generally be adjusted by the selection of the wicking material and, in particular, by adjusting the size and geometric configuration of the wicking member. The selection of the flowable build material and the predetermined temperature of the flowable build material when it is being normalized can also alter the mass flow rate. Also, the flow rate can be slightly increased when a vacuum assisted refreshing means 20 is used with the device 10.

It must be noted that the viscosity of the flowable build material should not be ignored in determining the mass flow rate of the material through the wicking member. The viscosity of the flowable build material is sensitive to temperature changes within the flowable build material during capillary draw. Thus, maintaining a constant temperature of the flowable build material during capillary draw is important to achieving a constant mass flow rate. Thus, a predetermined temperature for the flowable build material should be selected and maintained for the layer normalizing device 10, otherwise temperature fluctuations can undesirably alter the mass flow rate of the material moving through the wicking member 12.

The proper melt rate of the build material must also be taken into consideration when designing the wicking member 12. Because the build material dispensed by most SDM systems rapidly solidify upon impact with a given layer, it is generally necessary to locally heat the material to a flowable state just prior to normalizing the layer, as identified at step 36 in FIG. 4. Whatever heating means is used, it must be able to locally heat the material to its flowable state at a rate that is at least equal to the mass flow rate of the material being removed by capillary action. If the melt rate is less than the capillary draw rate during normalization, undesirable scraping and gouging will occur to the surface of the layer being normalized. Any heat source could be used, regardless of whether or not the source makes physical contact with the build material. In the embodiments shown, the heating means comprises a heater element that is in thermal communication with the wicking member 12 in order to provide the thermal energy necessary to locally melt the build material of a given layer that it contacts.

It is to be appreciated that the present invention layer normalizing device 10 can readily be adapted to dimensionally normalize layers of build material that reside in a flowable state at ambient temperatures, without the need to initially heat the build material as indicated at step 36 in FIG. 4. For example, a layer of ultraviolet curable resin could be dimensionally normalized with the present invention just prior to the resin being selectively solidified upon exposure to synergistic stimulation in a stereolithography process.

What has been described are preferred embodiments in which modifications and changes may be made without departing from the spirit and scope of the accompanying claims.

What is claimed is:

1. A layer normalizing device for use in dimensionally normalizing layers of a three-dimensional object produced by dispensing a build material in accordance with a selective deposition modeling technique, the device comprising:
    a wicking member having a body and a normalizing surface for dimensionally normalizing at least a portion of a layer of build material dispensed to produce the object while the build material is in a flowable state, the body having at least one interstice for contacting and wicking some of the flowable build material by capillary action through the normalizing surface and into the body of the wicking member from the portion of the layer being dimensionally normalized.

2. The layer normalizing device as described in claim 1 further comprising a heating means for heating the build material to the flowable state just prior to dimensionally normalizing the portion of the layer.

3. The layer normalizing device as described in claim 1 wherein each layer is built by depositing the build material in excess of a desired thickness prior to dimensionally normalizing the layer to the desired thickness by wicking excess build material from the layer by capillary action.

4. The layer normalizing device as described in claim 1 further comprising a refreshing means for ejecting the build material from the interstice of the wicking member.

5. The layer normalizing device as described in claim 4 wherein the refreshing means is a siphon passage in communication with the wicking member for ejecting the build material from the wicking member by siphon action.

6. The layer normalizing device as described in claim 5 wherein the refreshing means further comprises an upper reservoir and lower reservoir in communication with the siphon passage, the upper reservoir being adjacent to the wicking member to accept the ejected build material from the wicking member and deliver the ejected build material through the siphon passage to the lower reservoir.

7. The layer normalizing device as described in claim 6 wherein the refreshing means further comprises a vacuum source in communication with the siphon passage to assist in ejecting the build material from the wicking member.

8. A layer normalizing device for use in dimensionally normalizing layers of a three-dimensional object produced by dispensing a build material in accordance with a selective deposition modeling technique, the device comprising:
    a wicking member having a body and a normalizing surface;
        (a) the normalizing surface for contacting and dimensionally normalizing at least a portion of a layer of build material dispensed to produce the object while the build material is in a flowable state; and,
        (b) the body having at least one interstice in communication with the normalizing surface for wicking some of the flowable build material from the layer of build material by capillary action into the wicking member.

9. The layer normalizing device as described in claim 8 wherein the wicking member is made from a porous material having a plurality of interstices.

10. The layer normalizing device as described in claim 9 wherein the wicking member is made from a reticulated porous foam-type structure.

11. The layer normalizing device as described in claim 8 wherein the wicking member is made from at least two parallel plates secured in a layered configuration establishing at least one interstice between the plates.

12. The layer normalizing device as described in claim 8 further comprising:
    a heating means for heating the build material of the portion of the layer to be dimensionally normalized to the flowable state.

13. A method of dimensionally normalizing at least a portion of a layer of a three-dimensional object produced by dispensing a build material at a temperature sufficient to make the build material flowable in excess of a desired thickness of the layer in accordance with a selective deposition modeling technique, the steps comprising:
    maintaining at least a portion of the layer to be normalized at a sufficient temperature so that the build material in the portion of the layer is in a flowable state; and,
    wicking the excess flowable build material from the portion of the layer by capillary action to leave the portion of the layer at the desired thickness.

14. The method as described in claim 13 further comprising the step of ejecting the excess flowable build material.

15. A method for forming at least a portion of a layer of a three-dimensional object from a build material which is normally in a solid state and which is in a flowable state when maintained at a temperature at least as great as a flowable temperature, comprising the steps of:
    selectively dispensing the build material at a temperature sufficient to maintain it in a flowable state according to a prescribed pattern to form the portion of the layer of the three-dimensional object to a thickness greater than a desired thickness;

maintaining the dispensed build material forming the portion of the layer in the flowable state;

dimensionally normalizing the layer by wicking excess build material from the portion of the layer by capillary action while the excess build material is in the flowable state to leave the portion of the layer at the desired thickness; and, ejecting the excess build material.

16. The method as described in claim 15 wherein the steps are repeated for each layer of the three-dimensional object being formed.

17. A method for forming a three-dimensional object on a substantially layer by layer basis from a build material which is normally in a solid state and which is flowable when maintained at or above a flowable temperature, comprising:

maintaining the build material at or above the flowable temperature thereby forming flowable build material;

providing a build environment maintained at a temperature below the flowable temperature;

selectively dispensing the flowable build material into the build environment according to a prescribed pattern to form the portion of the layer of the three-dimensional object to a thickness greater than a desired thickness; and, dimensionally normalizing the portion of the layer to the desired thickness by wicking excess flowable build material from the portion of the layer by capillary action.

18. The method of claim 17 wherein the step of dimensionally normalizing each layer comprises:

heating the build material of the portion of the layer to a temperature at or above the flowable temperature;

wicking the excess flowable build material from the portion of the layer by capillary action; and ejecting the excess flowable build material from the build environment.

19. The method of claim 18 wherein the steps of selectively dispensing the flowable build material and dimensionally normalizing the portion of the layer are repeated as needed to form the three-dimensional object.

* * * * *